(12) United States Patent
James

(10) Patent No.: US 10,911,595 B2
(45) Date of Patent: Feb. 2, 2021

(54) ALERTING A CALLED PARTY TO AN URGENT CALL

(71) Applicant: SARONIKOS TRADING AND SERVICES, UNIPESSOAL LDA, Madeira (PT)

(72) Inventor: Robert James, Hatfield (GB)

(73) Assignee: Saronikos Trading and Services, Unipessoal LDA, Madeira (PT)

( * ) Notice: Subject to any disclaimer, the term of this patent is extended or adjusted under 35 U.S.C. 154(b) by 0 days.

(21) Appl. No.: 16/487,286

(22) PCT Filed: Feb. 21, 2017

(86) PCT No.: PCT/IB2017/050966
§ 371 (c)(1),
(2) Date: Aug. 20, 2019

(87) PCT Pub. No.: WO2018/154349
PCT Pub. Date: Aug. 30, 2018

(65) Prior Publication Data
US 2020/0059553 A1  Feb. 20, 2020

(51) Int. Cl.
*H04M 1/57* (2006.01)
*H04M 3/428* (2006.01)
(Continued)

(52) U.S. Cl.
CPC ......... *H04M 3/42042* (2013.01); *H04M 1/57* (2013.01); *H04M 3/42059* (2013.01); *H04M 3/436* (2013.01); *H04M 2242/22* (2013.01)

(58) Field of Classification Search
CPC .... H04M 1/57; H04M 3/42042; H04M 3/428; H04M 3/42059
(Continued)

(56) References Cited

U.S. PATENT DOCUMENTS 5,305,097 A * 4/1994 Sato .................. H04Q 11/0471
348/14.01
6,263,061 B1 * 7/2001 Tanaka ................. H04M 3/428
379/100.15
(Continued)

FOREIGN PATENT DOCUMENTS

| EP | 1217859 A1 | 6/2002 |
| JP | 2001-177646 A1 | 6/2001 |
| WO | 2012/010204 A1 | 4/2012 |

OTHER PUBLICATIONS

International Search Report dated Oct. 19, 2017, issued in PCT Application No. PCT/IB2017/050966, filed Feb. 21, 2017.
(Continued)

*Primary Examiner* — William D Cumming
(74) *Attorney, Agent, or Firm* — Workman Nydegger (57) ABSTRACT

A method, system, electronic device, communication server and apparatus are provided for alerting a called party that the caller of an incoming call has urgent need to talk, to reach someone or in general to communicate. The alert is sent through the user-user information field of a call setup message, and it may override the audio and video settings of the called party apparatus and overcome the current outputs of audio and video signals, so that it can be seen by the called person before it answer the call. The alert may be accompanied by personal information of the caller, in order that the recipient can ascertain the caller identity.

6 Claims, 3 Drawing Sheets

(51) Int. Cl.
*H04M 3/42* (2006.01)
*H04M 3/436* (2006.01)

(58) Field of Classification Search
USPC .............................. 370/352, 466; 379/100.15
See application file for complete search history.

(56) References Cited

U.S. PATENT DOCUMENTS

| | | | |
|---|---|---|---|
| 6,456,705 B1 * | 9/2002 | Tanaka | H04M 1/57 |
| | | | 370/466 |
| 6,766,007 B1 * | 7/2004 | Dermler | H04M 1/57 |
| | | | 370/352 |
| 7,734,003 B2 | 6/2010 | Aupperle et al. | |
| 2016/0183072 A1 | 6/2016 | Harish et al. | |
| 2020/0059553 A1 * | 2/2020 | James | H04M 3/42059 |

OTHER PUBLICATIONS

Written Opinion dated Oct. 19, 2017, issued in PCT Application No. PCT/IB2017/050966, filed Feb. 21, 2017.

* cited by examiner

ALERTING A CALLED PARTY TO AN URGENT CALL

BACKGROUND OF THE DISCLOSURE

Field of the Invention

The present invention relates to a method, system, electronic device, communication server and apparatus for alerting a called party that the caller of an incoming call has urgent reasons to talk, to reach someone or in general to communicate.

Description of Prior Art

It may happen that you call someone for an urgent reason, but the called party is not able to answer, because he or she is engaged in a meeting or is in a public place where they are not normally allowed phone calls, such as hospital wards or movie theater or theater.

Unfortunately, there are emergencies where both the caller (in situations of danger or emergency) and the called person (relative, doctor, etc.) have an absolutely need to establish a telephone connection even if the called person is in a situation where normally it would not respond.

It is known from the prior art that similar urgency situations can be conveyed to the called party in different manners. For instance from the U.S. Pat. No. 7,734,033 it is known to identify urgent phone calls with the use of a distinctive ring-tone for such calls. To obtain this result, the phone of the called person needs to include a list of callers authorized to activate this distinctive ring-tone. Obviously, this system does not work when the caller calls a person who does not have in his phone book the telephone number of the caller, marked with a flag that allows receiving these urgent phones calls with a distinctive ring tone. This may happen when the called person is a doctor, a policeman, an acquaintance that is not frequently in contact with the caller, etc.

From the PCT application WO2012/010204 it is known to inform the called person that a missed call probably had an urgent nature. The drawback of this solution is that the missed call having an urgent nature can be seen by the called person too late in respect to the situation in which the urgent call has been initiated.

SUMMARY OF THE INVENTION

It is therefore an object of the present invention to provide an improved method, system, electronic device, communication server, and apparatus for alerting a called person about the fact that the person who is making the call has urgent reasons to talk.

It is another object of the present invention to provide an improved method, system and apparatus for informing a called person that the caller is making a real emergency call, identifying the caller not only with his/her name, but also with some other identification data allowing the called person to be sure about the identity of the caller.

The present invention seeks to overcome the shortcomings of the mentioned prior art and other shortcomings by means of a method, system and apparatus allowing the called person to understand that the incoming one is an emergency call. To reach this goal the present invention sends an alerting information in the user-user information element provided in the setup message of the call, according to the specifications of the most used telephony standards, so that the called person can receive that alerting information before answering the call. To avoid stupid jokes, the alerting information may comprise identification data that allow the called party to ascertain the caller identity. The identification data may comprise the name of the caller and possibly other personal data (like the birthday of the caller or the recipient or the social security number in the case of call to a doctor or hospital). Moreover, the message can be protected by a digital signature or authenticated by a certificate. With this solution the called person, even in situations embarrassing, receives a call that says urgent/danger and the name of the caller and other identification data and immediately realizes that that is a real urgency and efforts must be made to answer.

In other words, in one embodiment of the invention a table is provided where next to the name and/or last name of the caller, possibly additional identification data are stored, in order to allow the called person to recognize the caller.

To obtain this feature, the keyboard of the phone or the touch screen should provide a key or an on-screen button indicating that the phone call to be placed is of the urgent type (red button, print "urgent"). In this way, in the following call one of the above information is given in addition to the telephone number of the caller and is included in the user-user IE. To let the user to select one of preset messages to be sent to the recipient, the keyboard should provide to the user an interface to choose the type of urgent message to be sent.

For alerting the called user according to the present invention, the calling party apparatus, which is associated with a calling line number, makes an attempt to call the called party apparatus, which is associated with a called line number, and states that the call is urgent by an alert information that the called party can hear and/or see before answering the call. To this purpose, the calling party apparatus, by its processing means, generates a first call setup message including the called line number and a user-user information element. This element comprises a user-user information field whose content is transported "transparently" to the called party apparatus through the communications networks. In the user-user information field the calling party apparatus puts the alert information.

Then the calling party transmits that first call setup message to a communication network, which receives it and generates, on its own part, a second call setup message, addressed to said called line number. This second call setup message comprises a second user-user information element, which comprises a second user-user information field, whose content is the same as that of said first user-user information field. Moreover, the second call setup message may comprise an information element notifying the calling line number.

The communication network transmits the second call setup message to the called party apparatus, which extracts from it the content of the user-user information field.

Finally, the called party apparatus issues an alert for its user, according to the extracted content of the user-user information field.

For allowing the recipient to ascertain the identity of the caller, the alert information may comprise personal data of the caller, as said above. At the called party side, the caller's personal data may be checked against the data contained in a "personal data table", where the recipient may have stored the telephone numbers of some contacts associated with their personal data. To do that check, the apparatus of the called party extracts, from the second call setup message, the calling line number and searches the personal data table for it and the personal data carried by the user-user information field. The result of the check is then presented to the user.

If the calling line number is not notified, the second call setup message will comprise an information element carrying the cause of the missed notification, for instance indicating that the caller line is of the type "private number". In this case the apparatus of the called party extracts that cause and outputs a suitable alert with the relevant information.

BRIEF DESCRIPTION OF THE DRAWINGS

The features of the invention are specifically set forth in the claims annexed to this description; such characteristics will be clearer from the following description of a preferred and non-exclusive embodiment shown in annexed drawings, wherein:

DETAILED DESCRIPTION OF THE INVENTION

In this description, any reference to "an embodiment" will indicate that a particular configuration, structure or feature, described in regard to the implementation of the invention, is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for the sake of simplicity, and do not limit the protection scope or extension of the various embodiments.

Also for the sake of simplicity the following description is made with reference to an apparatus that is of a smartphone type and connects to a cellular mobile network. However the skilled person will understand that the invention can be applied to many other apparatus types and networks. In particular the method of the invention may be applied to all the 3GPP (3rd Generation Partnership Project) systems and the telephony systems that uses the most common application-layer signaling protocol ISDN User Part (ISUP) with Signalling System No. 7, (see ITU-T Q.737.1). In fact, in the Initial Address Message (IAM), ISUP can provide a user-to-user information service (UUS) like that assumed in the explanatory example used in this description to illustrate the invention. Moreover, the invention may also be applied to systems utilizing the Session Initiation Protocol (SIP), as with SIP an application can insert User-to-User Information (UUI) data during the initiation phase of session establishment. Voice over IP (VoIP), for example, can benefit from the UUI data.

Figure 1:
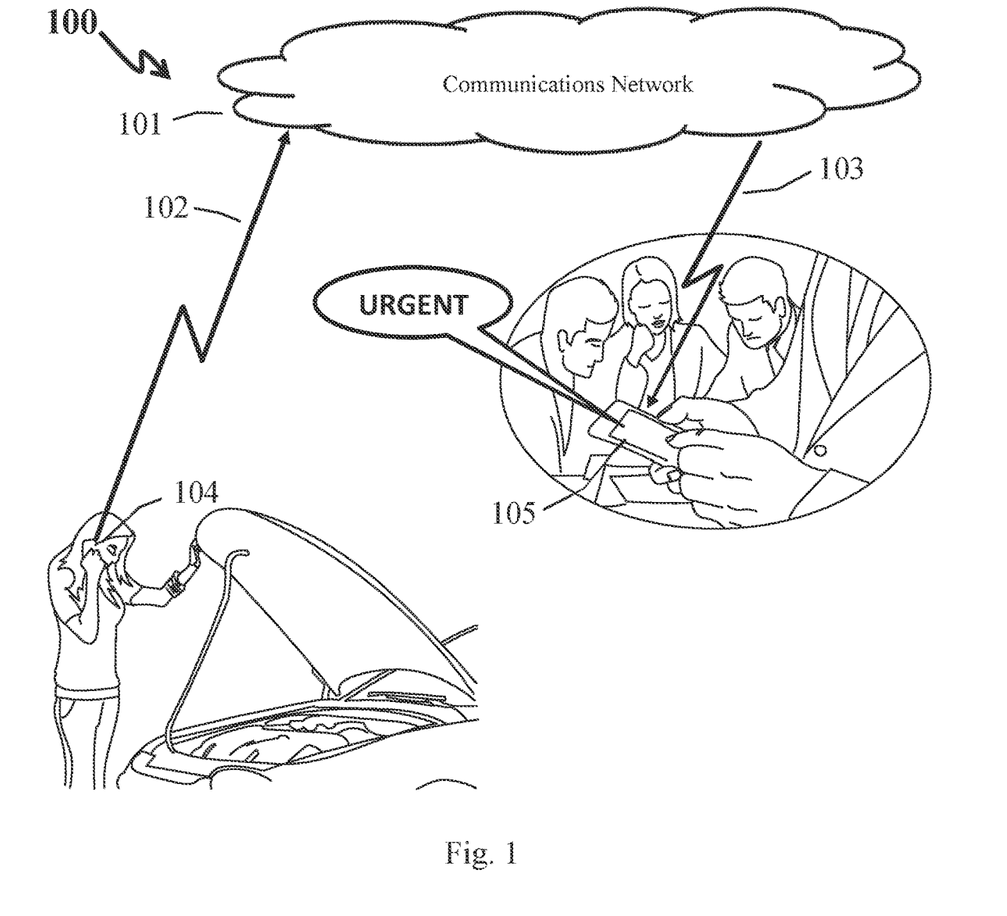
FIG. 1 shows the main components of a system for alerting the called party to an urgent call.

As depicted in the example shown in FIG. 1, the basic components of the systems are:
- a calling apparatus 104, according to the invention, which is associated with a calling line number and configured as a user apparatus at the calling party side,
- a called party apparatus 105, according to the invention, which is associated with a called line number and configured as a user apparatus at the called party side, and
- a communication network 101, configured for routing telephone calls, through which the apparatuses 104 and 105 communicate.

When a mobile phone makes a call attempt, it sends to the mobile network a first setup message 102 comprising the line number to call and other data needed for establishing a connection. That first setup message 102 may include a so called "user-user Information Element" (user-user IE), that has the purpose to convey information from the calling party to the called party. The user-user IE includes in fact a user-user information field (user-user IF) that is transported transparently to the called party through the communication network 101. The user-user IE is specified in ITU-T Q.931 [ITU.Q931.1998] and 3GPP TS 24.008 [TS.24.008], among others.

With the present invention, the calling party apparatus 104 uses that user-user IF to convey to the called party an alert information possibly comprising ancillary data for allowing the called party to check the caller identity. In the user-user IF the caller may also add information on the reason of the call.

To make a call attempt carrying said alert information, the calling party apparatus 104 has a specific key, or button, or "tile" that the user has to press or tap. That key or button is appropriately labelled (e.g., "URGENT", "DANGER", "HELP", or similar words) and possibly highlighted by decoration (e.g., red) and icon. You can also have other means to initiate the activation of an urgent call, such as gestures or combinations of keys or buttons, provided that what the user has to do is something simple to remember and does not imply a significant probability of inadvertently placing urgent calls.

When the user presses that key or taps that button, the calling party apparatus 104 includes a first user-user IE in the first setup message 102 that it sends to the communication network 101. The content of the first user-user IE and, in particular, the content of its user-user IF is detailed later on.

The calling party apparatus 104 transmits the first setup message 102, with its first user-user IE, to the communication network 101.

The communication network 101 receives that first setup message 102 and extract and analyzes the data that it carries. On their basis, the communication network generates a second setup message 103, and, if the first setup message 102 carries a user-user IE, the communication network include in the second setup message 103 a second user-user IE as well, wherein its user-user IF (second user-user IF) is same as that of the first user-user IF. Then the communication network 101 transmits the second setup message 103 to the called party apparatus 105.

The called party apparatus 105 receives the second setup message 103 and extracts the content of the second user-user IF. On the basis of that content and before the its user can answer the call, it outputs an alert and, possibly, data on the caller identity and on the reason of the call.

Basically, the content of the user-user IF may include in fact different types of information associated with caller:
just the name/last name of the caller (useful if the telephone number of the caller is stored in the phone book of the called party apparatus 105; in this case the recipient can make a double check between the name/ last name received with the second setup message 103 and that one store in his/her phone book), date of birth of the caller (useful for relatives and acquaintances), social security number of the caller (useful for calls directed to your doctor or health facilities), and any other information that is peculiar to the calling party and the reason of the call.

Checking the alert information against data stored in a personal data table, as mentioned above, is a kind of password-based authentication, easy to integrate, simply to manage, and without additional costs. On the other hand, as any password-based authentication, security is low.

For higher security levels, one could authenticate the alert information by a digital signature or by a certificate. The security level could be higher even though hashes have to be short, considering that the maximum size of the user-user IE, according to the 3GPP specification, is 35 bytes [3GPP TS 24.008]. On the other hand, managing digital signatures and certificates is cumbersome and involves costs, and the content of the alert information has to shrink in fewer byte to make room for digests.

A simpler way to obtain secure authentication would be to include in the alert information a URL (Uniform Resource Locator) that points to a website which offers authentication services. However, this a hardly feasible solution because of the difficulty to have URLs fitting within few bytes, even though examples of short URLs exist, possibly using compression techniques, as in the case of Eddystone-URLs. Moreover, this requires that the called party apparatus can access the web and, if it can, getting the authentication could take time.

The alert information may be a simple word or few words, such as "URGENT", "VERY URGENT", "I NEED HELP", or others. The alert information can also be a code word that can be translated through an appropriate deciphering algorithm into one of the above expressions, or other expressions, according to the preferred language that is set in the called party apparatus 105 and the apparatus characteristics (e.g., display capabilities).

Having received that alert and those data, the recipient can better face the request to have a phone call.

Figure 2:
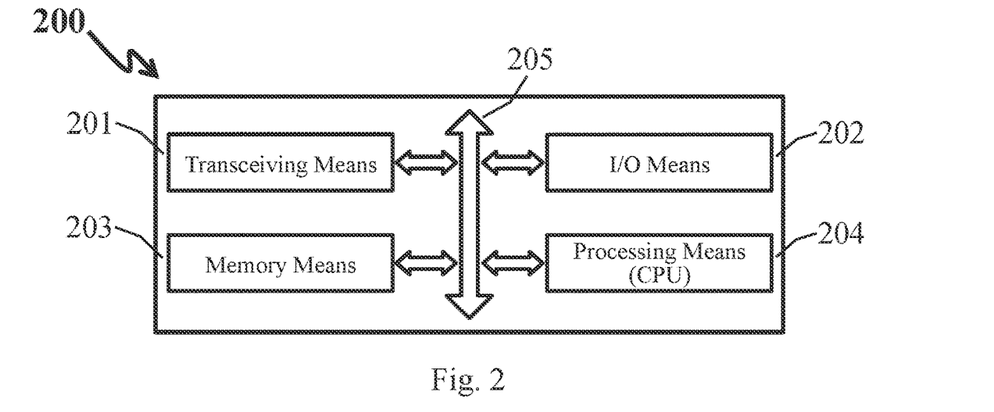
FIG. 2 shows the main elements of an apparatus, according to the invention.

FIG. 2 shows the essential elements required to implement the invention:

- Transceiving means 201, adapted to connect to a communication network 101 and exchange messages;
- processing means 204, like a Central Processing Unit (CPU), configured for executing a set of instruction for managing the elements implementing the creation of a first call setup message 102, including a user-user IE, and extracting data from a received second setup message 103, which may include a calling line number or an information element indicating the cause why a calling line number is not notified, and a second user-user IE;
- memory means 203 adapted to contain at least the data and instructions used by the other elements of the apparatus and, in particular, the data that might be included in the user-user IE;
- I/O means 202 adapted to receive inputs from the user and emit audio signals and, possibly, display information and pictures; in particular, the I/O means 202 are adapted to output audio and video signals for alerting the user, possibly overriding the values of current settings and overcoming current outputs.
- a communication bus 205, which allows the exchange of information among the elements of the set 200.

In a first embodiment of the invention, the content of the user-user IF is preset, so that, to place an urgent call, the calling user has nothing to do but pressing or tapping the "URGENT" button and selecting from the phone book, or keying in, the telephone number to call. Depending on the general characteristics of the calling party apparatus 104 (e.g., menu configuration), and in particular on the structure of its phone book, the activation of the "URGENT" key or button may be done before or after entering the telephone number to call, as the skilled person understands.

At the called party side, the called party apparatus 105 could have a "personal data table" stored in the memory means 203, wherein some telephone numbers are associated with personal data of the respective contacts. In that table, some personal data may be taken from the phone book and others may be taken or added automatically or manually from other sources. The recipient of the second call setup message 103 can thus compare the data carried by the user-user IF against those of the personal data table and ascertain the caller identity. This requires that the second setup message 103 received by the called party carries the calling line number.

In a useful embodiment of the invention, in order to improve the check of the authenticity of the alert message a communication server may be envisaged in the network. When the calling party makes an alert phone call and includes in the first call setup message 103 what is the name (first name and family name) and possibly other personal data of the caller, the communication server controls in its data base if the personal data of the calling party are consistent with those contained in the subscriber register associated with the phone number of the calling party. If this check is positive, no action is taken and the network sends a regular call setup message (the second call setup message 103) to the called party. In the case of discrepancy between these data, the communication server sends to the called party an information, like "pay attention the caller name is not the one registered as Subscriber". This information may be embedded in one of the information elements that the network may include in the second setup message or in a specific message that the network can send to the called party, such as a regular SMS, or other kinds of messages, according to the capabilities of the called party apparatus. It is clear that this system of checking authenticity requires that the communication server has in its data base information relating to the user and the phone number of the calling party. Also, problems of the user privacy should be considered implementing this type of embodiment of the invention. With this respect, the subscriber should sign a disclaimer about the permission of using his/her personal data when the communication server uses the name of the subscriber to implement this authenticity measure.

The case where the calling line number is not notified will be dealt with later on.

Figure 3:
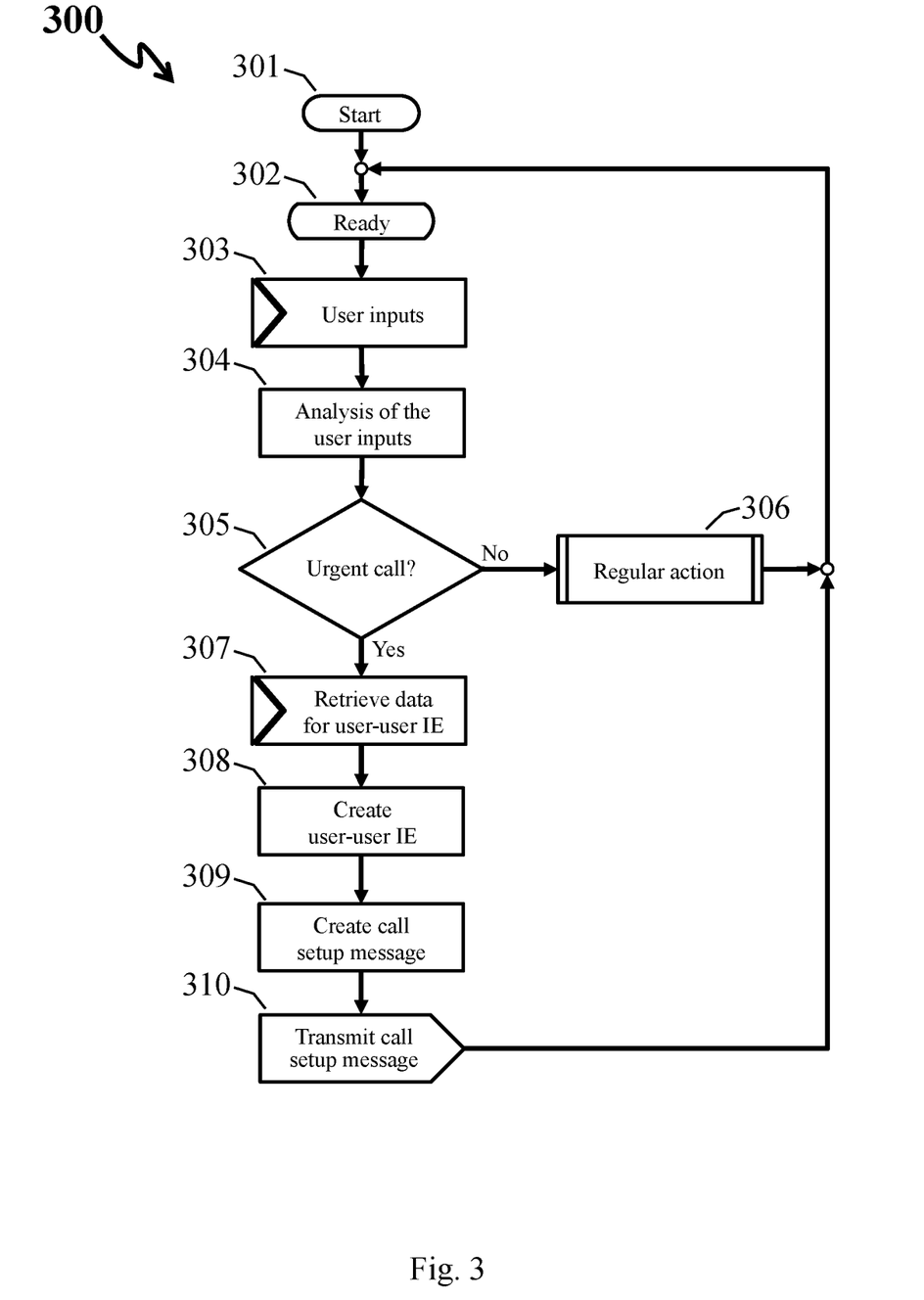
FIG. 3 shows a flow chart depicting the operation of the calling party apparatus for alerting the called party to an urgent call.
Figure 4:
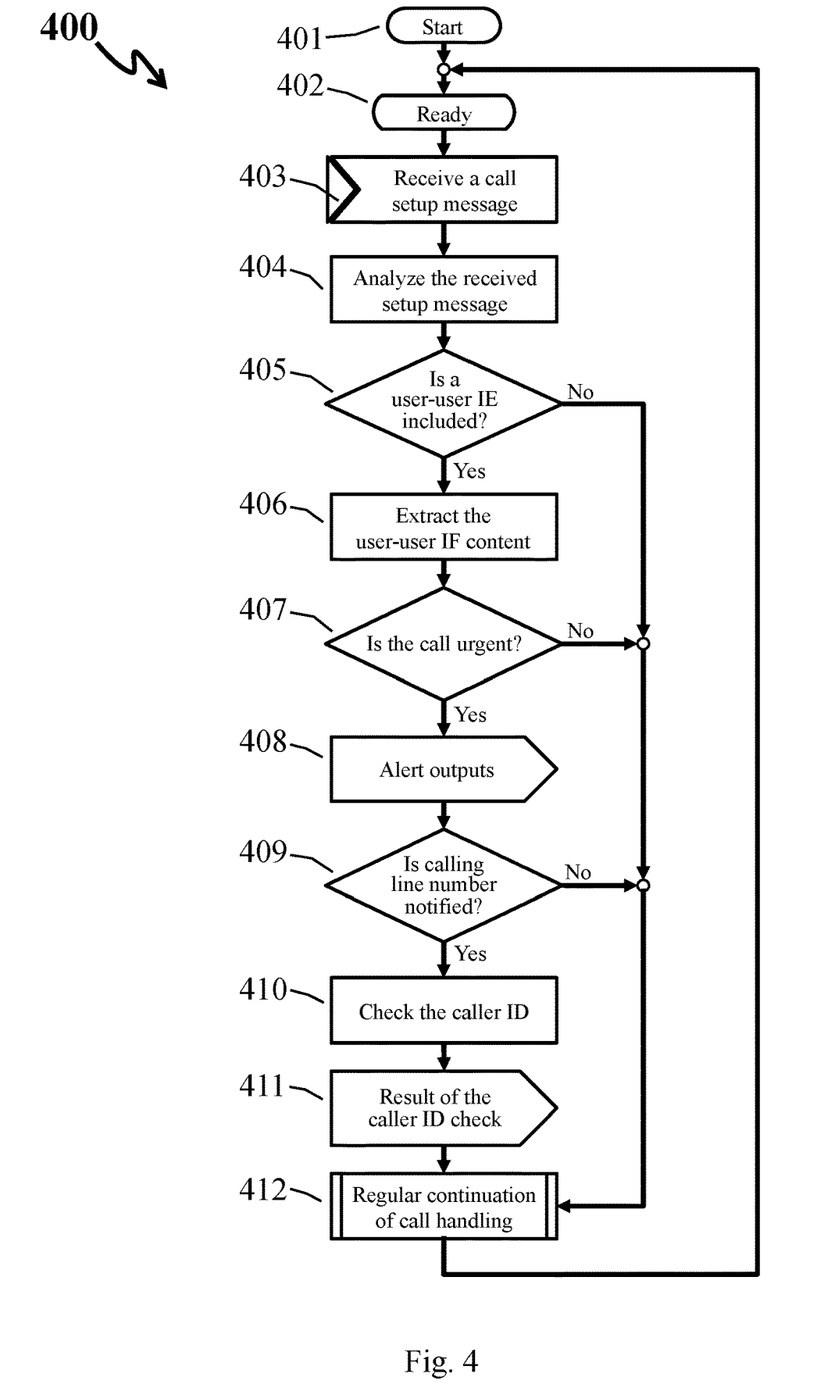
FIG. 4 shows a flow chart depicting the operation of the called party apparatus for alerting its user to an incoming urgent call.

The above description of the way the present invention carries out its main tasks is summarized in the exemplary flow charts shown in FIGS. 3 and 4.

The flow chart of FIG. 3 sketches the process for issuing the first call setup message 102, carrying a user-user IF, according to the following main phases:

301 Start of the process.

302 Ready state: the calling party apparatus 104 waits for user inputs.

303 User inputs: the user presses keys or taps or touches buttons to input commands and data.

304 Analysis of the user inputs: the user inputs are analyzed and the possible activation of the "URGENT" button is detected.

305 Determination on urgent call: if the user requests to place an urgent call, the process goes to phase 307, otherwise it continues to phase 306.

306 Regular action: the process calls the procedure for carrying out the action requested by the user, which does not involve placing an urgent call, then it goes back to the ready state 302.

307 Retrieve data for user-user IE: the data needed to create the user-user IE are retrieved from the "personal data table", stored in the memory means 203.

308 Create user-user IE: a first user-user IE is created with the data retrieved from the memory means 203.

309 Create call setup message: a first call setup message 102 is created including the first user-user IE created in the previous phase.

310 Transmit call setup message: the first setup message 102 created in the previous phase is transmitted to the communication network 101 through the transceiving means 201 and the process goes back to the ready state 302.

On the other side the process for alerting the called party to an incoming urgent call is sketched in FIG. 4 by a flow chart that comprises the following main phases:

401 Start of the process.

402 Ready state: the called party apparatus 104 waits for a second call setup message 103.

403 Receive a call setup message: a call setup message 103 is received from the communication network 101.

404 Analyze the received setup message: the contents of the information elements of the received second call setup message 103 are extracted and analyzed. In particular the disclosure of the calling line number and the existence of user-user IE is checked.

405 Determination on user-user IE: if a user-user IE is included in the received call setup message 103, the process continues to phase 406, otherwise it goes to phase 412.

406 Extract the user-user IF content: the content of user-user IF, is extracted and analyzed.

407 Determination on urgent call: if the user-user IF comprises an alert information according to the invention, the process continues to phase 408, otherwise it jumps to phase 412.

408 Alert outputs: the called party apparatus 105 emits audio and video alerting signals according to the content of the received second call setup message 103, and, in particular, according to the disclosure of the calling line number and the content of the user-user IF. These alerting signals may override the audio and video settings of the called party apparatus and overcome the current outputs of audio and video signals.

409 Determination on the calling line number: if the calling line number is notified, the process continues to phase 410, otherwise it jumps to phase 412.

410 Check the caller identity: the data carried by the user-user IF are compared against those of the personal data table stored in the memory means 203 of the called party apparatus 105.

411 Outputs on identity check: the results of the check carried out in the previous phase is presented to the user of the called party. In case of matching data, a simple confirmation of the caller identity may be given, while in the case of mismatch, or missing data, appropriate visual warnings and/or alert sounds may be given.

412 Regular continuation of call handling: the process continues as a regular procedure for handling an incoming call, in which the called party may answer the call or not. Then the process go back to the ready state (phase 402).

In a second embodiment of the invention, at the calling party side part of the content of the user-user IF is automatically taken from a table or the phone book, where at least one datum, which preferably has a special meaning for the called party with reference to the relevant contact, is stored (e.g., the social security number of the caller, that its doctor could check). This allows the calling party to tailor the information sent through the user-user IF to the recipient acquaintance with the calling party (e.g., sending the social security number to a doctor, a particular date or nickname or other peculiar personal data to a relative or a friend). This minimizes the size of the user-user IF and simplifies the check by the called party.

In a third embodiment of the invention a number of alternative contents for the user-user IF are stored in the memory means 203 and the user is prompted to select one of them, through the touch screen or the keyboard and the graphical interface.

In a fourth embodiment of the invention the user is given the chance to select and modify a preset content for the user-user IF, or even to type in a brand new one, also in this case through the touch screen or the keyboard and the graphical interface.

So far we have assumed that the calling line number is notified to the called party. However, it may happen that it is not for some reason. In this case the second call setup message 103 will include an information element providing the called party with the detailed reason why the calling line number is not notified/withheld. So the called user will be informed if the calling line number is not notified for a technical reason (e.g., interaction with other services), or the call is coming from a coin line/payphone, or the calling party has applied the calling line identification restriction. In this last case the restriction on the calling line number should be clearly highlighted and stated.

In any case the decision to answer the call or not is up to the called user.

In a variant applicable to all the above embodiments of the invention, the calling party apparatus, after having transmitted said first call setup message, may prompt its user to send to the called party an accompanying text/video message. A message comprising text and images could be welcome for providing additional information or instruction about the event relevant to the urgent call. Additional information may be, for example, the street address where the caller is or where the recipient should go, details of people to contact, images depicting what happened around the caller, and other pieced of information. The message content could be automatically initialized with the content of the already sent user-user IF, or part of it. The type of that message could be SMS, MMS, WhatsApp, Direct Twitter message, iMessage, or others types, according to the capabilities of the apparatuses and the knowledge that the calling party has about the habits of the called party.

An accompanying message is also useful to cope with a temporary inability for the called person to hear the call alert, having left the phone away or in an isolated place.

With the aforesaid features of the invention a person that is in a difficulty can promptly ask for help and the called person can understand the urgency even if he or she is engaged in an important and demanding activity. Moreover, with the invention one can send information ascertaining the caller's identity and useful information for allowing the called person to take the best way to respond.

According to a further variant applicable to all the above embodiments, to give the user the possibility of selecting and sending quickly the desired message identifying the user who is making the alarm phone call, the calling party apparatus can provide a set of pre-stored information and a graphical interface. In this way, the calling party apparatus is apt to present the user with the various messages to be sent, in order to allow the calling party the possibility to choose the most appropriate one. In fact, the alerting information may have predefined format and types for an automatic and/or manual selection and transmission as the first call setup message. These types of pre-stored messages may be in particular different alerting expressions such as "HELP", "FIRE", "CAR ACCIDENT", "CALL BACK IMMEDIATELY", "HOSPITAL", "ERDQUAKE" or the like, or may be the current position of the user apparatus taken from a GPS/navigation system incorporated in such apparatus. In last case, the position of the calling apparatus can be transferred to the navigation system of the called apparatus to show the called party the route to be followed to reach the calling party. In other words as an alternative or in addition to the aforementioned messages, different alerting expressions as well as pre-defined messages, the messages may comprise data to plan a route to the caller/user, a time information (current or in the future), a temperature value, an altitude value and/or movement speed, to enable the called party to deduce more information and to arrange the necessary steps depending on the given situation.

According to a further advantageous aspect of the present invention a communication server is proposed, which is configured to perform at least a part of the described methods here or according to the annexed method claims. Alternatively or supplementary the communication server is adapted to recognize the alert information in the first call setup message 102 and is further configured to initiate a second information signal dependent on the recognized said alert information, in particular by including a specific information in the second call setup message 103 that the communication network 101 sends to the called party or by triggering an additional or separate message or an emergency call. By this way, the transmitted alert information is processed by the communication server before the reception of the call setup message by the called party, which is very helpful, especially in cases in which the calling user is in a dangerous situation and emergency measures are necessary.

The present description has tackled some of the possible variants, but it will be apparent to the person skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A user apparatus for alerting a called party to an urgent call, said apparatus being adapted to be a user apparatus for voice calls and messages at a calling party side, associated with a calling line number, and to be a user apparatus for voice calls and messages at a called party side, associated with a called line number, comprising:
   an input/output;
   a transceiver;
   a memory;
   a central processing unit communicatively coupled with said input/output, said transceiver, and said memory;
   wherein said central processing unit is configured for:
   generating, at the calling party side, a first call setup message comprising said calling line number and a first user-user information element, which comprises a first user-user information field;
   transmitting, through said transceiver, said first call setup message to a communication network to transmit the first call setup message to a called party apparatus;
   receiving, at the called party side, from said communication network, through said transceiver, a second call setup message comprising a second user-user information element, which comprises a second user-user information field in a call setup message from a calling party apparatus;
   extracting, at the called party side, the content of said second user-user information field, wherein:
   the content of said second user-user information field is configured to comprise an alert information to the called party side; and
   at the called party side, said central processing unit is configured to output audio and/or video alerting signals and information, through said input/output, according to the content of said second user-user information field.

2. The user apparatus according to claim 1, wherein said output of audio and/or video alerting signals and information override audio and video settings of the called party apparatus and overcome current outputs of audio and video signals.

3. The user apparatus according to claim 1, wherein said alert information is configured further to comprise at least one personal datum of a caller and said second call setup message is configured further to comprise a calling line number, and wherein:
   said memory is configured to comprise a personal data table, in which at least one personal datum is associated with a calling line number; and
   said central processing unit is also configured for:
   extracting said calling line number from said second call setup message;
   checking said at least one personal datum of the caller, contained in said second user-user information field, against the data contained in said personal data table; and
   outputting the result of said personal data check through said input/output.

4. The user apparatus according to claim 1, wherein said second call setup message is configured not to comprise a calling line number, but is configured to comprise an information element carrying the cause of the missed notification of the calling line number, and said central processing unit is further configured for extracting said cause of the missed notification of the calling line number and outputting relevant information and alerts through said input/output.

5. The user apparatus according to claim 1, wherein said central processing unit is configured to prompt a calling party to send an accompanying message comprising elements taken from the content of said first user-user information field.

6. The user apparatus according to claim 1, wherein said central processing unit is configured to provide predefined types of alerting messages for an automatic and/or manual selection and transmission as said first call setup message, including at least one of different alerting expressions, current position of said user apparatus, planned route of said caller, time information, temperature value, altitude value or movement speed.

\* \* \* \* \*